United States Patent Office 2,962,507
Patented Nov. 29, 1960

2,962,507

PROCESS FOR MAKING 4,4-DIMETHYL-METADIOXANE

Michel Charles Ferdinand Hellin, Rueil-Malmaison, and Fernand Charles Coussemant, Paris, France, assignors to Institut Français du Petrole des Carburants et Lubrifiants, Rueil-Malmaison, France No Drawing. Filed Mar. 21, 1958, Ser. No. 722,848

Claims priority, application France Mar. 22, 1957

8 Claims. (Cl. 260—340.7)

This invention relates to a process for making 4,4-dimethylmetadioxane.

It is known in the art to produce 4,4-dimethyl-metadioxane by means of the condensation of pure isobutene with formaldehyde, eventually in the presence of paraffinic hydrocarbons, which do not participate in the reaction but serve as inert solvents for the reactants only.

This known process suffers from the drawback that it requires, as a preliminary measure, the preparation of pure isobutene. When, on the other hand, a mixture of hydrocarbons having less than five carbon atoms per molecule as well as isobutene and other olefins is reacted to obtain 4,4-dimethylmetadioxane, it is not possible to separate the latter in a satisfactory manner from the dioxane byproducts of the reaction, either by distillation or extraction with solvents. Moreover, such treatment leads to considerable losses of formaldehyde due to the condensation of the latter with the other olefins in the mixture.

It is, however, much more interesting from an industrial point of view, to produce 4,4-dimethylmetadioxane from a mixture of hydrocarbon compounds in which the various hydrocarbons have less than 5 carbon atoms per molecule, and contain varying amounts of isobutene and eventually other olefinic hydrocarbons in mixture with paraffinic hydrocarbons. Until yet, it has not been possible in the art to separate the desired 4,4-demethylmetadioxane satisfactorily from the other dioxanes and other byproducts either by distillation or by extraction with solvents, nor has it been possible to avoid the considerable losses of formaldehyde, which are caused by the condensation of the latter with the olefins other than isobutene, present in the mixture, and which losses make the process uneconomical.

We have carefully studied the reactions involved in the condensation of the aforesaid hydrocarbon mixture with formaldehyde in an aqueous medium and with a strong acid as the condensation catalyst. The reaction which leads to the desired formation of 4,4-dimethylmetadioxane can be represented by the following equation:

(1) 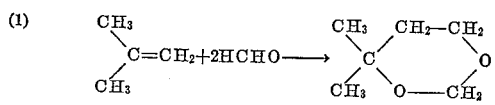

However, the formation of this dioxane is accompanied or even dominated, by other reactions leading to the formation of byproducts which it has not been possible to eliminate satisfactorily in the hitherto known modes of carrying out the process. Thus, other dioxanes, diols, alcohols, are formed with the other olefins present in the hydrocarbon starting mixture, as well as further condensation products.

In the starting materials which are most easily available, namely the cracking fractions containing either $C_4$ compounds alone, or a mixture of $C_3$ and $C_4$ compounds, there are contained paraffinic hydrocarbons such as butane, isobutane and propane, as well as olefinic hydrocarbons apart from isobutene, namely, butene-1, butene-2, propylene.

The various olefinic compounds in this latter type of starting materials react with formaldehyde in the manner described above, the most important competing reactions being that of 4,5 dimethylmetadioxane formation according to the equation:

(2) 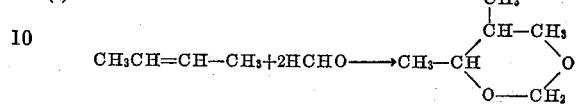

that of 4 ethylmetadioxane formation according to a similar equation, that of tertiary butyl alcohol formation according to the equation:

(3) 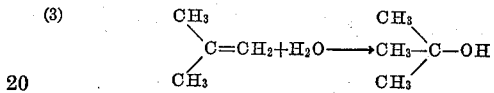

and that of methyl 3 butanediol 1-3 according to the equation:

(4) 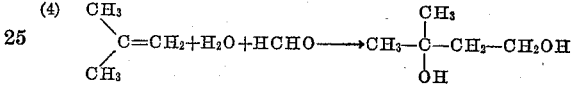

The formation of alcohols and diols derived from the olefins other than isobutene is negligible.

It is, therefore, an object of our invention to provide a process for producing 4,4-dimethylmetadioxane from the above-described type of mixed hydrocarbon starting material, by condensation with formaldehyde, in which process the competing reactions of tertiary butyl alcohol and methyl 3 butane diol 1-3 formation are substantially suppressed and the formation of dioxanes is favored.

It is another object of our invention to provide a process as described as the above object, which permits to obtain a pure or substantially pure 4,4-dimethylmetadioxane at an optimal hourly yield rate and in easily separable form, preferably in a continuous process, and with a minimum loss of formaldehyde through competing reactions.

It is still another object of our invention to provide a process for obtaining 4,4-dimethylmetadioxane as substantially the only reaction product from a hydrocarbon mixture of the type described and formaldehyde.

These objects are attained and the drawbacks of the known art avoided by our invention, which provides for a process of forming 4,4-dimethylmetadioxane from an isobutene-containing starting material of the kind described, with formaldehyde on the basis of our discovery that it is possible to steer the reaction in such a manner that substantially exclusively isobutene in the starting material is permitted to react with formaldehyde under formation of the desired end product, while all other side reactions as stated above are substantially slowed down or completely suppressed.

The process according to our invention thus comprises the steps of carrying out the reaction of the gaseous or liquid mixture of hydrocarbons having less than five carbon atoms per molecule and containing isobutene near other olefins and paraffins with an aqueous acid-containing solution of formaldehyde, in which there are introduced either from the start or gradually during the reaction, at least more than two and preferably from four to ten and more moles of HCHO per mole of isobutene to be reacted, and wherein the ratio of HCHO to $H_2O$ is preferably maintained between 1:4 and 1:2 parts by weight throughout the reaction, while the acid employed is a strong acid such as sulfuric or phosphoric acid, present in the solution in a ratio relative to $H_2O$ of from $\frac{1}{15}$ to 1 for sulfuric acid and from ¼ to 5 for phosphoric acid, these ratios being chosen preferably of from 1/7 to 1/2 for the former acid and from 2/3 to 1 for the latter.

It is critical, in order to avoid the above-mentioned formation of alcohols as an undesirable byproduct of the reaction, to provide for an excess of formaldehyde above the stoichiometrically required two moles per mole of isobutene in the reaction medium. Thus, while it may sometimes be sufficient to have a slight excess of HCHO present, we prefer to operate with an excess of from 4 to 10 and sometimes up to 100 moles of formaldehyde instead of the 2 moles stoichiometrically required for the formation of the desired dioxane derivative from each mole of isobutene.

The presence of this excess of formaldehyde has no uneconomical effect on the process, since no undue losses of HCHO occur, only the above-mentioned two moles of HCHO per mole of isobutene being consumed during the reaction. The excess of formaldehyde is to be maintained substantially at the same level throughout the reaction by gradual addition of the same in replacement of the quantities of HCHO consumed in the formation of the end product.

If the operation is carried out continuously, the replacement of consumed formaldehyde can take place during the recycling of the aqueous solution.

As has been mentioned above, the amount by weight of water in the aqueous formaldehyde solution should be preferably twice to four times the amount of formaldehyde, and should in fact, not exceed ten times that amount, since such large amounts of water would favor the undesirable formation of tertiary butyl alcohol and methyl 3 butane diol 1-3. On the other hand, the amount of water should not be less than equal to the amount of formaldehyde in the solution, since otherwise, the yield of 4,4 dimethylmetadioxane would be strongly decreased in favor of heavier products containing oxygen bridges of the ether type C—O—C.

Furthermore, if the acid employed is sulfuric acid, the amount thereof present in the formaldehyde-water mixture should be from 5 to 35% by weight, while, if phosphoric acid is used, about 15 to 75% by weight of the aforesaid mixture should be present therein as $H_3PO_4$.

Formaldehyde as used in the process of our invention includes its polymeric forms such as paraformaldehyde. The use of the latter offers the advantage of avoiding an excessive dilution of the acid utilized as a catalyst in the amounts stated above.

Strong acids in the meaning of this application are acids conventionally known as such, i.e. having a dissociation constant equal to or greater than that of the first acidic function of phosphoric acid ($K > 10^{-2}$). In each case the acid concentration should be chosen in order to obtain a value from 0 to −2 for the acidity function $H_0$ as defined and measured by L. P. Hammett (Journal American Chem. Soc. 56, 827, 1934).

Other conditions to be observed during the process according to our invention are a temperature range preferably between 55 and 75° C., and the temperature should not exceed 85° C. nor be substantially below room temperature. Too low a temperature would reduce the reaction velocity to such a degree that the hourly yield rate of 4,4-dimethylmetadioxane would be unduly reduced and the process would become uneconomical. This yield rate could also not be increased by augmenting the acid concentration in the reaction medium, because this would lead to a partial decomposition of the desired end product already during the reaction, and the formation of undesirable byproducts which it would be very difficult to separate from the end product, apart from the undesirable reduction of the yield.

On the other hand, it is also necessary to observe the above stated lower limits of acid concentration in order to obtain a satisfactory hourly yield rate.

An increase in temperature beyond the above stated critical limit would lead to a carbonization of the reaction products and consequently to an impure product.

As can be seen from the aforegoing explanations, we have discovered that, in order to obtain a selective predominance of the formation of 4,4 dimethylmetadioxane leading to a substantially pure final product, a number of critical conditions must be observed, among which there are:

(1) The ratio of formaldehyde to isobutene present in the starting material, and
(2) The ratio of formaldehyde to water, and
(3) The ratio of acid to water during the reaction, and
(4) The temperature at which the reaction is carried out.

Further important conditions to be observed if maximum yields are to be obtained, comprise the application of a total pressure throughout the reaction, which is in excess of the prevailing atmospheric pressure sufficiently that the partial pressure of isobutene is 0.02 to 15 atmospheres; the total pressure thus depends largely on the exact composition of the starting hydrocarbon mixture. As the reaction velocity of the desired 4,4 dimethylmetadioxene formation increases in proportion to the pressure applied up to a maximum value obtained when the pressure is sufficient to have the hydrocarbon starting material in a liquid state, it is more convenient to apply this latter pressure and accordingly to operate in liquid phase.

The yield of 4,4 dimethylmetadioxane may be further improved noticeably by providing for a continuous reduction of the concentration of the desired dioxane in the reaction medium, i.e. for a continuous removal of the end product as it is formed. This can be achieved by solvent extraction or by increasing the "ionic strength," the dioxane product being only partially soluble in water.

By carrying out the process of formation of the desired dioxane under the above enumerated conditions, it is possible to determine the reaction velocity and consequently to interrupt the reaction as soon as the isobutene in the starting material has either completely reacted with formaldehyde, or so high a proportion of the isobutene has reacted that a continuation of the reaction to convert the remaining isobutene would be uneconomical. Thus, it may be advisable to interrupt the reaction before the entire isobutene has been reacted with formaldehyde, and thereby to obtain an exceptionally pure end product.

The purity of the 4,4-dimethylmetadioxane attainable in practice, depends to a certain extent on the rate of isobutene present in the starting material. Assuming that the reaction is allowed to continue until at least 95% and up to 99.5% of the isobutene present in the starting material has been reacted, and the latter contains more than 45% of isobutene, the resulting 4,4-dimethylmetadioxane contains only from about 1 to 2.5% of other dioxanes. If the starting material contains between 20 and 45% of isobutene, and the reaction is carried out to a conversion of 95% of the available isobutene, the resulting metadioxane product still contains only from 1 to 4% of other dioxanes.

It is generally desirable to interrupt the reaction of isobutene with formaldehyde, when about 95 to 99.5% of isobutene have been converted, as the reaction of the last remainders of isobutene is extremely slow and is accompanied by parallel reactions of the other olefins contained in the hydrocarbon starting mixture, the reaction products of which then become incorporated as undesirably large amounts of other dioxanes in the final product.

If the above-mentioned undesired dioxane of up to 2.5% is not considered inadmissible, the conversion of isobutene from a starting mixture containing at least 45% of the same, may be continued until about 99.7 to 99.8% of the isobutene have been reacted with formaldehyde, and a most satisfactory yield of 4,4-dimethylmetadioxane can be obtained.

The process of the invention shall be further illustrated by a number of examples, which are, however, not to be considered as limitative of the scope of the invention, in any way or form.

EXAMPLE I

A starting mixture containing 504 grams (9 moles) of isobutene and 504 g. (9 moles) of butene-1 is treated by means of vigorous bubbling at room temperature in a closed work cycle, with an aqueous acidic formaldehyde solution consisting of 3731 g. of water, 1510 g. of HCHO and 519 g. of $H_2SO_4$ at a temperature of 60° C. and at atmospheric pressure. The number of formaldehyde moles at the start is more than five times that of isobutene moles available in the reaction. About 2.5 times as much water in weight is contained in the water-HCHO-acid system as there is formaldehyde present, and the acid content is almost 10% in weight of the combined amounts of water and formaldehyde.

While the reaction is in progress, the formaldehyde content of the reaction medium is checked every ten minutes and the formaldehyde consumed during the reaction is replaced by the addition of further HCHO, until, after about 166 minutes, approximately 570 g. of formaldehyde have been added, thus bringing the total HCHO amount to 2080 g. or about eight times the number of isobutene moles.

In the meantime, the mixture is constantly and intimately brought into contact with the aqueous medium due to the bubbling.

After the above time of about 2 hours 45 minutes, about 99% of the total amount of isobutene present in the starting mixture have reacted with formaldehyde, while the absorption of formaldehyde by butene-1 is practically negligible, amounting to only 1.55% of the initial amount of the latter olefin.

The reaction products are then extracted from the reaction mixture by means of 2 liters of cyclohexane, and the various extracted products separated from each other and from the solvent by fractional distillation.

The following fractions are obtained:

(1) 927 g. of 4,4-dimethylmetadioxane having a purity of 98.4%, which corresponds to a yield of 87.2% of the pure product relative to the isobutene amount present, and 82.5% with regard to the formaldehyde consumed during the reaction,
(2) 15 g. approximately, of condensation products of butene-1, consisting mainly of ethyl-4-metadioxane,
(3) 27.5 g. of tertiary butyl alcohol, and
(4) 30.2 g. of methyl-3-butanediol 1–3, both byproducts of the isobutene condensation, and
(5) 147 g. of a heavier residue of higher molecular weight condensation products.

EXAMPLE II

A starting mixture containing 830 g. of isobutene (14.8 moles) and 900 g. butene-2 (16.1 moles) is treated in the same manner as described in Example I, with an aqueous acidic solution containing 1505 g. (about 50 moles) of formaldehyde and 1470 g. of sulfuric acid $H_2SO_4$ in mixture with 3325 g. of water at a temperature of 20° C., and under atmospheric pressure.

At the start, the number of formaldehyde moles is more than three times as large as that of isobutene. 2.2 times as much water in weight is present in the reaction medium as there is formaldehyde present, the acid content being about 30% in weight of the combined amounts of water and formaldehyde.

As the reaction proceeds, check tests are made every ten minutes to determine the formaldehyde consumption, and new formaldehyde is introduced to maintain the formaldehyde concentration in the reaction medium constant throughout the reaction. This requires about 1000 g. of formaldehyde which are added gradually during a period of about 5 hours and 40 minutes, at which time about 99% of the isobutene present in the starting mixture have reacted with formaldehyde, while the competing reaction of formaldehyde with butene-2 amounts to only 3.8% of the total amount of the latter.

While this constitutes a slightly higher participation of the other olefinic constituent, leading to the formation of condensation products which consist chiefly of 4,5-dimethylmetadioxane, than is the case in Example I, the condensation products of isobutene are substantially the same as in the preceding example.

Extraction of the end products from the reaction mixture by means of 3 liters of decahydronaphthalene, and subsequent fractional distillation lead to 1520 g. of 4,4-dimethylmetadioxane having a degree of purity of 96%, and constituting a yield of 85% relative to the initial amount of isobutene, and of 82.5% relative to the formaldehyde consumed during the reaction.

EXAMPLE III

As starting material, there is used a gaseous cracking cut of gas oil, consisting of an average number of four carbon atoms per molecule. Analysis by means of infrared rays, and chromatography in the vapor phase yield the following composition of the cut:

| Hydrocarbons: | Percent by weight |
| --- | --- |
| n-Butane and isobutane | 12 |
| Isobutene | 25 |
| Butene-1 | 31 |
| Butene-2 | 30 |
| Hydrocarbons with 3 and 5 carbon atoms per molecule | 2 |
| Total | 100 |

5 kilograms (kg.) of this cracking cut are treated in an autoclave having a capacity of 50 liters and provided with an automatic shaking device, with a solution of 2040 g. of formaldehyde and 1980 g. $H_2SO_4$ in 4480 g. of water, at a temperature of 60° C. in an autoclave, and under a pressure of about 7 kg./cm.$^2$. There result in the autoclave two liquid phases which are intimately mixed by shaking the autoclave vigorously. The consumption rate of HCHO is determined, for instance every 10 minutes by conventional analysis on samples of the reacting mixture, and a constant concentration of the formaldehyde is maintained by bleeding some of it into the autoclave at the aforesaid intervals. In the course of about 85 minutes, approximately 1460 g. of formaldehyde have been added to the reaction medium, the total number of formaldehyde moles being 117, and therefore, about five times as many moles of formaldehyde are introduced as there are moles of isobutene present in the starting material (about 22.3 moles).

After the above-mentioned time of 85 minutes, 99% of the total available isobutene have reacted with formaldehyde, while only 2.9% and 1.5% respectively, of butene-2 and butene-1 have reacted.

The reaction products are then extracted with four liters of cyclohexane, and separated by fractionated distillation. The main fraction is constituted by 2320 g. of 4,4-dimethylmetadioxane having a degree of purity of 95%, while the byproducts of isobutene condensation in the amount of about 240 g. consist mostly of 4,5-dimethylmetadioxane and 4-ethylmetadioxane. The yield of pure 4,4-dimethylmetadioxane is, therefore, 86% of the theoretical amount based on the reacted isobutene.

EXAMPLE IV

Example I is repeated, but the reaction is interrupted after 96 minutes, as soon as 90% of the isobutene present in the starting material have been converted. While accepting the loss of 10% of isobutene, the 4,4-dimethylmetadioxane thus obtained has a purity of 99.2% instead of only 98.4% purity in Example I.

EXAMPLE V

Example II is carried out under the same conditions as described, but the reaction is interrupted after 192 minutes. At this time, only 90% of the isobutene present in the starting mixture have reacted. However, the purity of the finally obtained 4,4-dimethylmetadioxane is 97.8% instead of only 96% as in Example II.

EXAMPLE VI to X

Example III is repeated under exactly the same conditions as set forth above. However, the reaction period is interrupted at earlier stages of isobutene conversion with a corresponding increase in the purity of the desired end product, 4,4-dimethylmetadioxane, as compiled in the following Table I:

Table 1

| Example No. | Percent of Isobutene reacted | Duration of Reaction with HCHO, min. | Purity of End Product (percent) |
| --- | --- | --- | --- |
| VI | 72 | 26 | 98.0 |
| VII | 84 | 36 | 97.7 |
| VIII | 88 | 42 | 97.2 |
| IX | 92.5 | 50 | 96.5 |
| X | 96 | 60 | 96.0 |
| III | 99 | 85 | 95 |

EXAMPLE XI

Example I is repeated, under the conditions set forth above. However, instead of sulfuric acid, the aqueous acidic mixture contains 1900 g. of $H_3PO_4$. Cetane is used as the extraction solvent instead of cyclohexane. The results of this treatment are the same as in Example I.

EXAMPLE XII

Example II is repeated, but instead of sulfuric acid phosphoric acid is introduced into the solution in such amounts that the latter contains 3280 g. of $H_3PO_4$. The reaction takes place with a slightly inferior reaction velocity due to the larger volume of acidic solution and the ensuing weaker concentration of formaldehyde.

Table I shows that, while always operating within the conditions according to our invention, it is possible to determine, at will, the degree of purity of the end product by correspondingly interrupting the reaction prior to a substantially complete conversion of the isobutene present in the starting material.

It is understood that hydrocarbon mixtures having as an average less than five carbon atoms per molecule, and containing isobutene as well as other olefinic hydrocarbons, may be used as starting materials for obtaining 4,4-dimethylmetadioxane by the process according to our invention, regardless of the proportions of the various constituents.

This 4,4-dimethylmetadioxane has many uses, for example, in the U.S. patent to Arundale et al., 2,721,223, patented October 18, 1955, it is stated that these metadioxanes have been found to be desirable solvents for resins and lacquers, antiknock agents for gasoline, and sovents for lubricating oil dewaxing operations.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A process for producing 4,4-dimethylmetadioxane from a starting mixture of aliphatic hydrocarbons having an average content of less than 5 carbon atoms per molecule and consisting of isobutene and another member selected from the group consisting of: olefinic hydrocarbons and mixtures of olefinic hydrocarbons with paraffinic hydrocarbons, comprising the steps of: reacting said starting mixture at a temperature between 10 and 85° C. and under a pressure of at least one atmosphere, in an aqueous solution of a strong inorganic acid having a dissociation constant of at least equal to $10^{-2}$, having added thereto an amount of formaldehyde above the stoichiometrically required two moles per mole of isobutene present in the starting mixture, said acid being present in amounts of 5 to 75% by weight of the total amount of water and formaldehyde, maintaining throughout the reaction a ratio by weight of water to formaldehyde in the range of 1:1 to 10:1; separating the organic layer from the aqueous solution by extraction with a hydrocarbon solvent to obtain an organic extract as soon as the major portion of the total amount of isobutene has reacted with the formaldehyde; and isolating 4,4-dimethylmetadioxane by fractionally distilling said extract.

2. A process for producing 4,4-dimethylmetadioxane from a starting mixture of aliphatic hydrocarbons having an average content of less than 5 carbon atoms per molecule and consisting of isobutene and another member selected from the group consisting of: olefinic hydrocarbons and mixtures of olefinic hydrocarbons with paraffinic hydrocarbons, comprising the steps of: reacting said starting mixture at a temperature between 10 and 85° C. and under a pressure of at least one atmosphere, in an aqueous solution of a strong inorganic acid having a dissociation constant of at least equal to $10^{-2}$, having added thereto an amount of formaldehyde above the stoichiometrically required two moles per mole of isobutene present in the starting mixture, said acid being present in amounts of 5 to 75% by weight of the total amount of water and formaldehyde, maintaining throughout the reaction a ratio by weight of water to formaldehyde in the range of 1:1 to 10:1; separating the organic layer from the aqueous solution as soon as no more than 99.5% of the total amount of isobutene has reacted with the formaldehyde; and isolating 4,4-dimethylmetadioxane.

3. The process of claim 2 wherein the separation of the organic layer from the aqueous solution is conducted when from 72 to 99% of the total amount of isobutene has reacted with formaldehyde.

4. A process for producing 4,4-dimethylmetadioxane from a starting mixture of aliphatic hydrocarbons having an average content of less than 5 carbon atoms per molecule and consisting of isobutene and another member selected from the group consisting of: olefinic hydrocarbons and mixtures of olefinic hydrocarbons with paraffinic hydrocarbons, comprising the steps of: reacting said starting mixture at a temperature between 55 and 75° C. and under a pressure of at least one atmosphere, in an aqueous solution of a strong inorganic acid having a dissociation constant of at least equal to $10^{-2}$, having added thereto an amount of formaldehyde above the stoichiometrically required two moles per mole of isobutene present in the starting mixture, said acid being present in amounts of 5 to 75% by weight of the total amount of water and formaldehyde, maintaining throughout the reaction a ratio by weight of water to formaldehyde in the range of 1:1 to 10:1; separating the organic layer from the aqueous solution as soon as the major portion of the total amount of isobutene has reacted with the formaldehyde; and isolating 4,4-dimethylmetadioxane.

5. The process of claim 1, wherein said isobutene in said starting mixture is at a partial pressure of 0.02 to 15 atmospheres.

6. A process for producing 4,4-dimethylmetadioxane from a starting mixture of aliphatic hydrocarbons having an average content of less than 5 carbon atoms per molecule and consisting of isobutene and another member selected from the group consisting of: olefinic hydrocarbons and mixtures of olefinic hydrocarbons with paraffinic hydrocarbons, comprising the steps of: reacting said starting mixture at a temperature between 10 and 85° C. and under a pressure of at least one atmosphere, in an aqueous solution of a strong inorganic acid having a dissociation constant of at least equal to $10^{-2}$, having added thereto an amount of formaldehyde above the stoichiometrically required two moles per mole of isobutene present in the starting mixture, said acid being present in amounts of 5 to 75% by weight of the total amount of water and formaldehyde, maintaining throughout the reaction a ratio by weight of water to formaldehyde in the range of 1:1 to 10:1 by gradually adding formaldehyde to the reaction medium in replacement of the quantities of formaldehyde consumed in the reaction; separating the organic layer from the aqueous solution as soon as the major portion of the total amount of isobutene has reacted with the formaldehyde; and isolating 4,4-dimethylmetadioxane.

7. The process of claim 1, wherein the acid is sulfuric acid in amounts between 5 and 35% by weight of the total amount of water and formaldehyde present in the reaction mixture.

8. The process of claim 1, wherein the acid is phosphoric acid in amounts between 15 and 75% by weight of the total amount of water and formaldehyde present in the reaction mixture.

References Cited in the file of this patent

UNITED STATES PATENTS

| | | |
|---|---|---|
| 2,158,031 | Loder | May 9, 1939 |
| 2,335,691 | Mottern | Nov. 30, 1943 |
| 2,362,307 | Ritter | Nov. 7, 1944 |
| 2,368,494 | Rosen et al. | Jan. 30, 1945 |
| 2,504,732 | Rosen et al. | Apr. 18, 1950 |
| 2,721,223 | Arundale et al. | Oct. 18, 1955 |